Sept. 11, 1956  H. G. LENZ  2,762,899
BAKE UNIT ASSEMBLY
Filed March 18, 1954  2 Sheets-Sheet 1
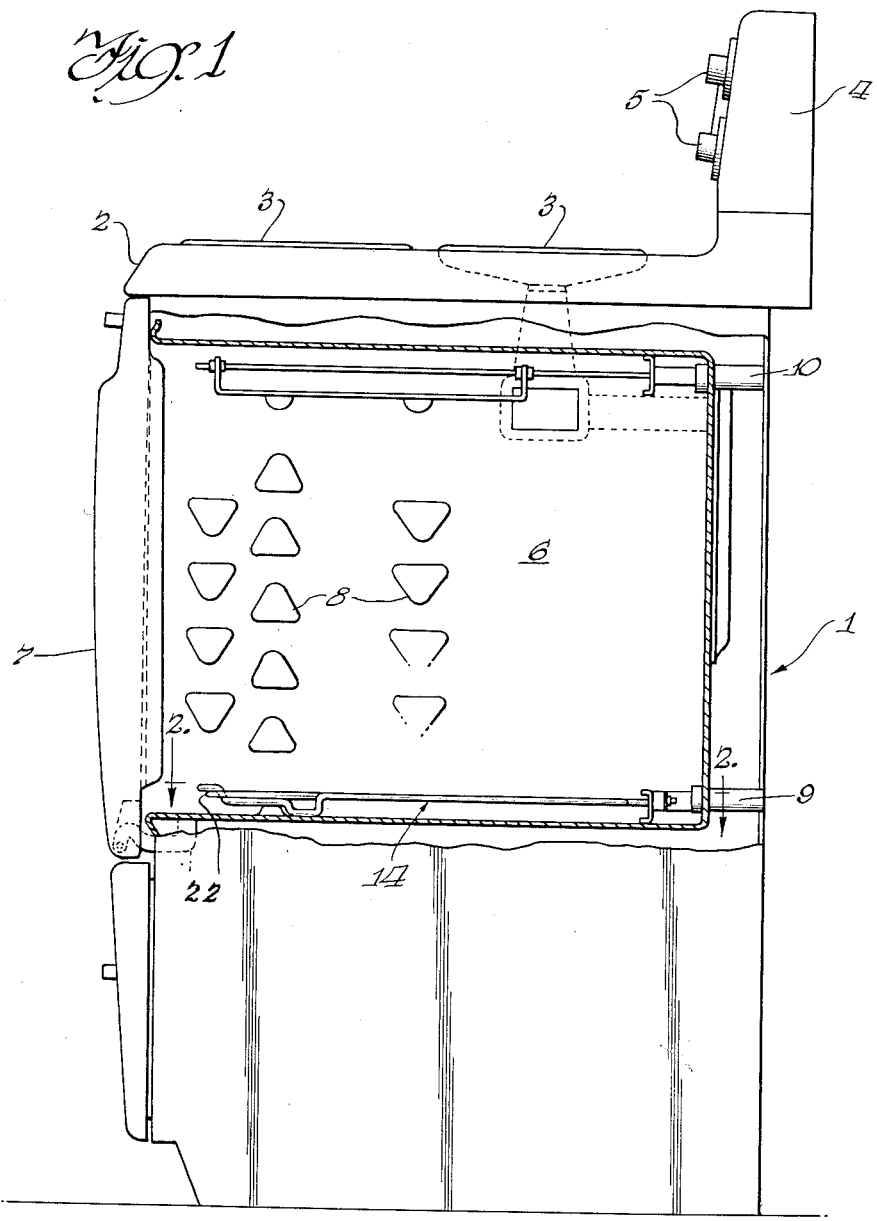
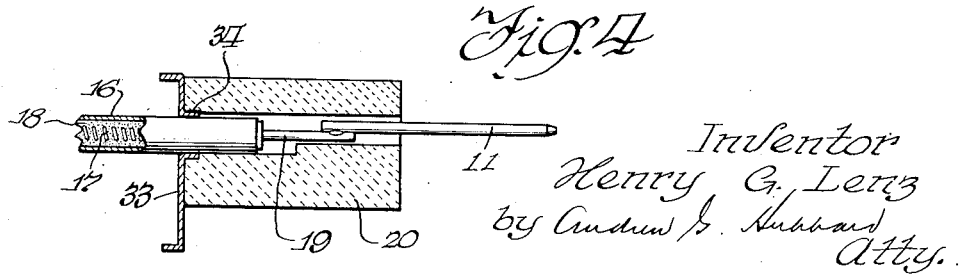
Inventor
Henry G. Lenz
by Andrew J. Hubbard
Atty.

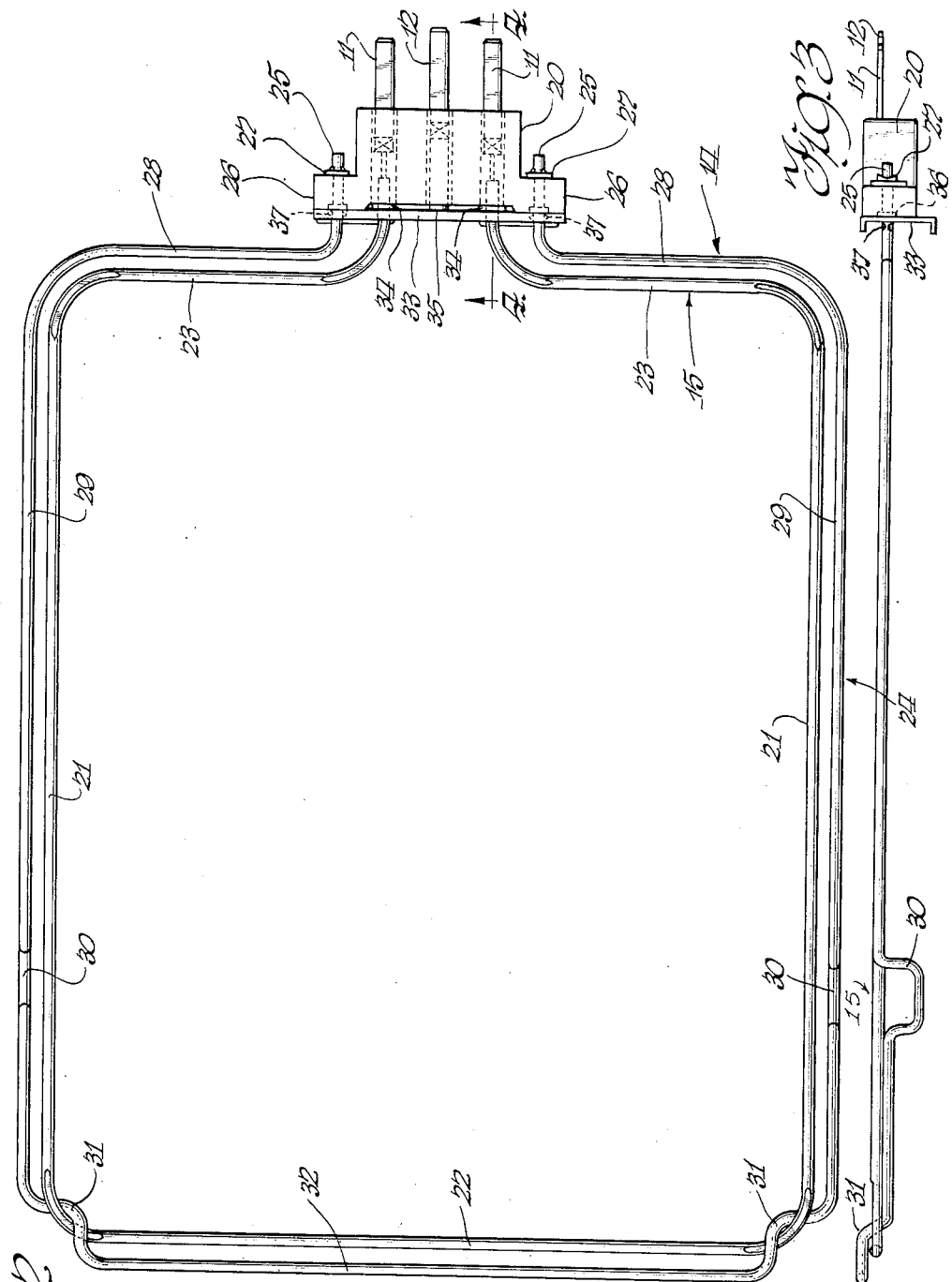

United States Patent Office 2,762,899
Patented Sept. 11, 1956

2,762,899

BAKE UNIT ASSEMBLY

Henry G. Lenz, Ballston Lake, N. Y., assignor to General Electric Company, a corporation of New York Application March 18, 1954, Serial No. 417,187

3 Claims. (Cl. 219—35)

This invention relates to heating elements for electric range ovens and the like, and in particular to an oven heating element having a simplified guard and support structure.

It has been found that improved baking results may be obtained by using a heating element at the top and at the bottom of the oven cavity, with the bottom heating element being fully exposed, of low thermal mass, and extending about the four walls of the oven in relatively close proximity thereto. The fully exposed element, as contrasted with elements having cover plates or baffles, improves the heat distribution within the oven, and the low thermal mass provides quick heating and quick cooling of the heating element as it is cycled by conventional thermostatic oven controls. It is advantageous to use a heating element of the tubular sheathed conductor type for oven heating units, because the metallic sheath thereof may be grounded and thus eliminate shock hazard. Low thermal mass requires that the heating element be of small diameter. In view of the practical consideration that heating elements must be readily removable from the oven to facilitate cleaning or for other purposes, it becomes important to protect the relatively fragile heating units while permitting ready removal from the oven.

It is therefore an object of the invention to provide an oven heating unit comprising the combination with a heating element of low thermal mass, of a guard and support member which is likewise of low thermal mass and interposes minimum resistance to the free circulation of air currents within the oven.

It is another object of the invention to provide a guard and support member for an oven heating element which facilitates the removal of the element from the oven.

It is a further object of the invention to provide an oven heating unit which is low in manufacturing cost, easy to assemble by unskilled workmen, and capable of long life without mechanical or electrical failure.

Other features and objectives of the invention will be apparent from the following detailed description of a presently preferred embodiment thereof, read in connection with the accompanying drawings in which:

Fig. 1 is a side sectional elevation of an electric range having an oven equipped with a lower heating unit embodying the invention;

Fig. 2 is a plan view of the heating unit, looking in the directions of the arrows 2—2 of Fig. 1;

Fig. 3 is a side elevation thereof; and

Fig. 4 is a side elevation of the terminal portion of the oven heating unit.

In Fig. 1, I have shown an electric range of conventional pattern, having a body structure 1, a cooking top 2 provided with a plurality of surface heating units 3, and a backsplash portion 4 on which are located the necessary plurality of switches 5 for the control of electrical energy to the surface units and other heating elements of the range. An oven 6 is suitably secured within the body structure. The oven is in all respects of conventional and well known construction; that is to say, it is a five-sided box-like structure rectangular in plan and in elevation. The open front is fitted with a door 7, arranged to be swung from a substantially vertical closed position to a substantially horizontal open position. The side walls of the oven are formed with a plurality of embossed projections 8 for the support of the usual oven racks (not shown). The rear wall of the oven has a lower connection receptacle 9 and an upper connection receptacle 10 which are fitted with the usual spring clip contact terminals (not shown) to receive the bladed terminals 11, 12 of an oven heating unit. The receptacles may be as shown in U. S. Patent 2,666,199, granted January 12, 1954, to Arnold G. Cook, for "Electrical Terminal Block Assembly" and assigned to my present assignee. It will be understood that the contact terminals of the respective receptacles are suitably electrically connected to one or more of the control devices 5 on the backplasher 4. In accordance with conventional practice, the center terminal 12 of the oven units is grounded by way of an appropriate terminal in the respective receptacles. There is a heating unit 13 at the top of the oven in detachable association with the upper receptacle 10, and a heating unit 14 at the bottom of the oven in detachable association with the receptacle 9. Said lower heating unit has been selected to illustrate the invention herein, although it must be understood that the invention is applicable to both lower and upper units.

The heating unit includes a heating element 15 of the tubular sheathed conductor type now well known in the art. Such heating elements comprise an outer metallic sheath 16, within which is a helix 17 of suitable resistance wire. Said helix is imbedded in a highly compacted mass 18 of electrically insulating and thermally conducting material such as finely divided magnesium oxide. The ends of the helix 17 are provided with rod-like terminals 19 which are respectively connected to the terminal blades 11. As indicated in Fig. 2, the terminal ends of the heating element enter openings in the ceramic terminal block 20.

By reason of the substantially rectangular shape of the heating element, its side portions 21 may be relatively closely adjacent the side walls of the oven cavity in substantial parallelism therewith, and the front portion 22 is adjacent to and parallel with the oven door 7, as appears in Fig. 1. The rear portions 23 extend in parallelism with the rear wall of the oven.

It is desirable to construct the heating element 15 for high wattage and low thermal mass. Accordingly, the helix 17 is sized for 2,000 watts output when connected across the usual 230 volt, three-wire Edison circuit; and the maximum outside diameter of the tubular sheath is of the order of .220 inch. This dimension prevails at all but the corners of the rectangularly arranged heating element, whereas as clearly appears in Fig. 2 and 3, the sheath is flattened. As is well known in the art, tubular sheathed heating elements are flattened in such areas to prevent fissures in the magnesium oxide by reason of the bending operation.

It has been established than an unbaffled rectangular heating unit disposed in the oven in the above noted relationship to the walls thereof produces an improved heat distribution pattern within the oven. It is necessary, however, to arrange the heating units for removal from the oven to permit the oven and the units to be cleaned. The elimination of a protective baffle and the necessity for removal are inconsistent with the inherent structural weakness of the small diameter and relatively unsupported heating unit. Accordingly, the present invention provides a combination guard and support member 24 which adequately protects the heating element without interference with the heat flow pattern created thereby.

The guard and support member comprises a single piece of rigid metal rod—for example, one-quarter inch diameter steel wire. Its end portions 25 are mounted in the extensions 26 of the ceramic terminal housing 20 and may be fixed therein by conventional friction fastenings 27. The rear portions 28 of the guard member and the greater portion of the side portions 29 thereof relatively closely parallel the rear and side portions of the heating element. As clearly appears, they are outward of the heating element and in the horizontal plane thereof. Near the front of the heating element however, the guard is formed with supporting legs 30, and it will be observed that forwardly of the legs the side portions of the guard member are below the heating element while maintaining the uniform spaced relation. At the intersection of the side and front portions of the heating element, the guard member turns inwardly below the element and then upwardly and outwardly thereof, thereby providing a loop 31 which supports the forward end of the heating element against upward or downward movement while permitting relatively free expansion and contraction in lateral directions. The front portion 32 of the guard, projecting forwardly of and above the heating element, protects the element at the front of the oven, at which location it is obviously most liable to damage. It will also be observed that the projecting forward portion 32 constitutes a handle which may be grasped to withdraw the heating unit from the oven cavity.

A third support for the heating element is provided at the rear of the unit by means of the channel-like ground plate 33 which, as appears from Figs. 2 and 3, extends across the front wall of the terminal housing 20. Said ground plate has embossed openings 34 (Fig. 4) which are in tight frictional engagement with the metal sheath 16 of the heating element, and there is an electrical connection 35 between the ground plate and the grounding terminal 12. Similarly, the ground plate is provided with the portions 36 which frictionally engage the ends of the guard 24 and serve thereby to connect said guard to the grounding terminal 12. It will be observed that the guard member is formed with ears or lugs 37 which serve to establish the relationship of the several parts in the terminal block area.

It will be observed from Figs. 1 and 3 that the legs 30 and the ground plate 33 position the heating unit horizontally at the bottom of the oven and that they align the terminal block 20 with the receptacle 9. When removing the unit only a direct outward pull is required; and, similarly, when the unit is to be replaced, it is merely set on the floor of the oven and pushed directly rearwardly, whereupon its terminals 11 and 12 will enter and engage with the contact terminals within the receptacle. The heating element is therefore not subjected to bending or torsional stresses during the handling thereof. The ground plate is a main structural element of the assembly in view of its mechanical attachment to the heating element sheath and the guard structure. It protects the terminal block against stresses which might cause it to crack during connection or disconnection of the unit from the receptacle 9.

The assembly of the heating element and guard structure is exceedingly simple. The guard structure enters the heating unit from beneath and then is rotated so that the respective parts occupy their Fig. 3 position. The ground plate is then applied and crimped about the sheath 16 and the guard member ends, and the respective terminals 11 and 12 appropriately affixed. The heating element and guard structure are then an integrated assembly. The terminal block or housing 20 is then threaded over the terminals and the ends of the guard structure and the friction fastenings 27 applied to complete the oven heating unit.

While there has been described what is at present considered to be the preferred embodiment of the invention, it will be understood that various modifications may be made therein, and it is intended to cover in the appended claims all such modifications as fall within the true spirit and scope of the invention.

I claim:

1. A heating unit for an electric bake oven or the like, comprising a heating element including a resistor insulatedly disposed within a tubular metallic sheath having an outside diameter of the order of one-quarter inch, said heating element being formed into substantially rectangular shape for substantially horizontal disposition within an oven cavity adjacent the front, side, and rear wall portions thereof, the rear portion of said heating element having terminals for releasable connection to an electric power source; a terminal block of insulation material disposed about said terminals to maintain the same in fixed spaced relation; combination guard and support means for said heating element, comprising a metallic rod formed into a substantially rectangular shape and having terminal ends extending through said terminal block, the front portion of said guard means intersecting said heating element below the sheath thereof and then rising above and forwardly of the front transversely extending portion of said element and extending parallel thereto in forwardly and upwardly spaced relation therewith; the side portions of said guard means being disposed wholly outwardly of the side portions of said heating element to extend coextensive therewith in parallel spaced relation, said side portions of said guard means having leg portions engageable with the floor of said oven; and a rigid metallic grounding plate disposed adjacent said terminal block in electrical contact with said metallic sheath and said guard means, said grounding plate having a foot portion providing a third support for said guard means and cooperating with the said leg portions thereof to maintain the plane of the heating unit substantially parallel to said oven floor.

2. A heating unit for an electric bake oven or the like, comprising a heating element including a resistor insulatedly disposed within a tubular metallic sheath having an outside diameter of the order of one-quarter inch, said heating element being formed into substantially rectangular shape, the rear portion of said heating element having terminals for releasable connection to an electric power source; a terminal block of insulation material disposed about said terminals; combination guard and support means for said heating element, comprising a metallic rod formed into a substantially rectangular shape and having terminal ends mechanically engaging said terminal block, the front portion of said guard means turning inwardly to intersect said heating element below the sheath immediately behind the front transverse portion thereof and then rising above and forwardly of said front transversely extending portion of said element and extending parallel thereto for substantially the full length thereof in forwardly and upwardly spaced relation therewith to provide a hand grip portion; the side portions of said guard means being disposed outwardly of the side portions of said heating element and having leg portions engageable with said oven floor; and a rigid metallic grounding plate disposed in surface contact with a transverse wall of said terminal block and in direct electrical contact with said metallic sheath and said guard means.

3. A heating unit for an electric bake oven or the like, comprising a heating element having a resistor insulatedly disposed within a tubular metallic sheath of relatively small outside diameter, said heating element being formed into substantially rectangular shape, the rear portion of said heating element having blade-like terminals for releasable connection to an electric power source; a terminal block of insulation material disposed about said terminals, said terminal block having outwardly extending side portions; combination guard and support means for said element comprising a single metallic rod formed into a substantially rectangular shape and having terminal ends extending through the side portions of said terminal block, means for securing the terminal ends of said guard means to said terminal block, the front portion of said guard means at each side thereof turning inwardly below the sheath of said heating element at the intersection of the side and front transverse portion of said element and then immediately passing upwardly and forwardly over said front transverse portion of said heating element to loosely confine said heating element within a loop-like formation of said guard means, the front transverse portion of said guard means forming a guard and handle element forwardly of and above said heating element; the side portions of said guard means being disposed outwardly of the side portions of said heating element and having leg portions engageable with the floor of said oven; a rigid metallic grounding plate extending substantially entirely across a face of said terminal block and embracing said guard means and said heating element sheath in tight mechanical and good electrical contact therewith, said grounding plate extending downwardly of said guard means sufficient to form a third supporting leg to maintain the plane of said heating unit parallel to the floor of said oven; and a grounding terminal fixed to said guard plate and extending therefrom through said terminal block.

References Cited in the file of this patent

UNITED STATES PATENTS

| | | |
|---|---|---|
| 1,023,982 | Barnes | Apr. 23, 1912 |

FOREIGN PATENTS

| | | |
|---|---|---|
| 351,169 | Great Britain | June 25, 1931 |
| 373,831 | Great Britain | June 2, 1932 |
| 619,743 | Great Britain | Mar. 14, 1949 |